(12) United States Patent
Huang et al.

(10) Patent No.: US 10,871,235 B1
(45) Date of Patent: Dec. 22, 2020

(54) FLOW REGULATING VALVE OF GAS STOVE

(71) Applicant: GRAND MATE CO., LTD., Taichung (TW)

(72) Inventors: Chung-Chin Huang, Taichung (TW); Chin-Ying Huang, Taichung (TW); Hsin-Ming Huang, Taichung (TW); Hsing-Hsiung Huang, Taichung (TW); Yen-Jen Yeh, Taichung (TW)

(73) Assignee: GRAND MATE CO., LTD., Taichung (TW)

( * ) Notice: Subject to any disclaimer, the term of this patent is extended or adjusted under 35 U.S.C. 154(b) by 0 days.

(21) Appl. No.: 16/534,633

(22) Filed: Aug. 7, 2019

(51) Int. Cl.
| | |
|---|---|
| *F16K 5/02* | (2006.01) |
| *F16K 5/10* | (2006.01) |
| *F16K 31/04* | (2006.01) |
| *F23N 5/24* | (2006.01) |
| *F16K 5/04* | (2006.01) |

(52) U.S. Cl.
CPC .......... *F16K 5/0271* (2013.01); *F16K 5/0285* (2013.01); *F16K 31/041* (2013.01); *F23N 5/245* (2013.01); *F16K 5/0414* (2013.01); *F16K 5/103* (2013.01)

(58) Field of Classification Search
CPC .... F16K 5/0271; F16K 5/0285; F16K 31/041; F16K 31/042; F16K 5/10; F16K 5/103; F16K 5/0414; F23N 5/245; F23N 1/002; F23C 3/126
USPC ................................................. 251/286–288
See application file for complete search history.

(56) References Cited

U.S. PATENT DOCUMENTS

| | | | | |
|---|---|---|---|---|
| 9,784,455 B2* | 10/2017 | Huang | .................... | F16K 3/316 |
| 10,006,550 B2* | 6/2018 | Huang | .................. | F16K 5/0207 |

FOREIGN PATENT DOCUMENTS

| | | |
|---|---|---|
| EP | 2520861 A2 | 11/2012 |
| EP | 3045788 A1 | 7/2016 |
| EP | 3517841 A1 | 7/2019 |

(Continued)

OTHER PUBLICATIONS

The extended European search report for 19191495.1, dated Nov. 11, 2019, Total of 6 pages.

(Continued)

*Primary Examiner* — Michael R Reid
(74) *Attorney, Agent, or Firm* — Tracy M. Helms; Apex Juris, pllc.

(57) ABSTRACT

A flow regulating valve, including a valve member, a plug member, a connecting member, a fixed base, and a stepper motor. The valve member has a chamber respectively communicating with an inlet hole and an outlet hole thereof. The plug member has an axial bore and a flow regulating structure, the axial bore corresponding to the outlet hole and the flow regulating structure corresponding to the inlet hole. The connecting member is disposed at a side of the plug member and at least a part of the connecting member is exposed to the outside. The fixed base has a through hole, a wall of which is provided with a first block section and a second block section. A space is formed between the first block section and the second block section, and a block of the connection member is located in the space to limit a rotating angle of the plug member. The stepper motor has a rotating shaft connected to the connecting member and a modular flow regulating valve is formed.

9 Claims, 9 Drawing Sheets

(56) References Cited

FOREIGN PATENT DOCUMENTS

| GB | 1260296 A | * | 1/1972 | ............. | F16K 5/106 |
| GB | 1261141 A | * | 1/1972 | ............. | F16K 5/103 |
| TW | M321500 U | | 11/2007 | | |
| TW | 200936960 A | | 9/2009 | | |
| TW | 201422995 A | | 6/2014 | | |
| TW | M562369 U | | 6/2018 | | |

OTHER PUBLICATIONS

Examination report for TW108120103, dated Feb. 5, 2020, Total of 4 pages.
Search report for TW108120103, dated Feb. 5, 2020, Total of 1 page.
English abstract for TW200936960, Total of 1 page.
English abstract for TW201422995, Total of 1 page.
English abstract for TWM321500, Total of 1 page.
English abstract for TWM562369, Total of 1 page.

* cited by examiner

FLOW REGULATING VALVE OF GAS STOVE

BACKGROUND OF THE INVENTION

Technical Field

The present invention generally relates to a gas stove, and more particularly to a flow regulating valve of a gas stove.

Description of Related Art

Gas stoves such as barbecue grills or kitchen gas stoves are the most commonly used stoves. The reason is, compared to electric heating stoves, gas stoves have higher heat energy generated by burning gas, so the heating time and the response time of flames adjusting are faster than those of electric heating stoves.

A conventional gas stove includes a burner, a manual flow regulating valve and a knob. When in use, press the knob first and rotate to have gas flowing through the manual flow regulating valve to the burner to ignite flames and then for cooking. By rotating the knob, the gas flow is regulated by the manual flow regulating valve to adjust the flames output from the burner.

With the advancement of science and technology, technology and life are getting closer and closer. The technology of smart houses and home safety brings convenience and security to people in life. Conventional gas stoves, however, are difficult to integrate with modern science and technology due to users must regulate the gas flow with the manual flow regulating valve. How to combine gas stoves with modern science and technology to provide people with a more convenient and safer living environment is the goal that the industry needs to develop hard.

BRIEF SUMMARY OF THE INVENTION

In view of the above, a purpose of the present invention is to provide a flow regulating valve of a gas stove that can be applied to automatic control.

To achieve the object mentioned above, the present invention provides a flow regulating valve of a gas stove, including a valve member, a plug member, a connecting member, a fixed base, and a stepper motor. The valve member has an inlet hole, an outlet hole, and a chamber which respectively communicates with the inlet hole and the outlet hole. The valve member has a joint end which is provided with an opening communicating with the chamber. The plug member rotatably provided in the chamber of the valve member has an axial bore in an axial direction and a flow regulating structure in a radial direction. The axial bore corresponds to the outlet hole and communicates with the flow regulating structure, and the flow regulating structure corresponds to the inlet hole. The plug member has a connecting end facing away from the axial bore and corresponding to the opening of the joint end. The connecting member that is disposed on the connecting end has a block in a radial direction, and at least a part of the block is located outside the opening of the joint end. The fixed base has a first side and a second side positioned back-to-back. The first side is engaged with the joint end of the valve member. The fixed base further has a through hole communicating with the first side and the second side and corresponding to the opening. A wall of the through hole is provided with a first block section and a second block section, and a space for rotating the block is formed between the first block section and the second block section. The connecting member passes through the through hole, and at least a part of the block is in the space to limit a rotating angle of the plug member. The stepper motor that includes a motor body and a rotating shaft is connected to the second side of the fixed base, and the rotating shaft is connected to the connecting member.

An advantage of the present invention is to form a modular flow regulating valve by engaging the stepper motor with the valve member through the fixed base. And, the rotating shaft of the stepper motor drives the connecting member to rotate, the connecting member then drives the plug member to rotate, resulting in the flow regulating structure of the plug member rotating relative to the inlet hole of the valve member to regulate the flow rate of the gas, so that the automatic control of the gas flow can be achieved and gas stoves are more convenient to use. The first block section and the second block section of the fixed base can further limit the rotating angle of the plug member, so that the rotating position of the plug member can be determined.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

The following illustrative embodiments and drawings are provided to illustrate the disclosure of the present invention, these and other advantages and effects can be clearly understood by persons skilled in the art after reading the disclosure of this specification.

Figure 1:
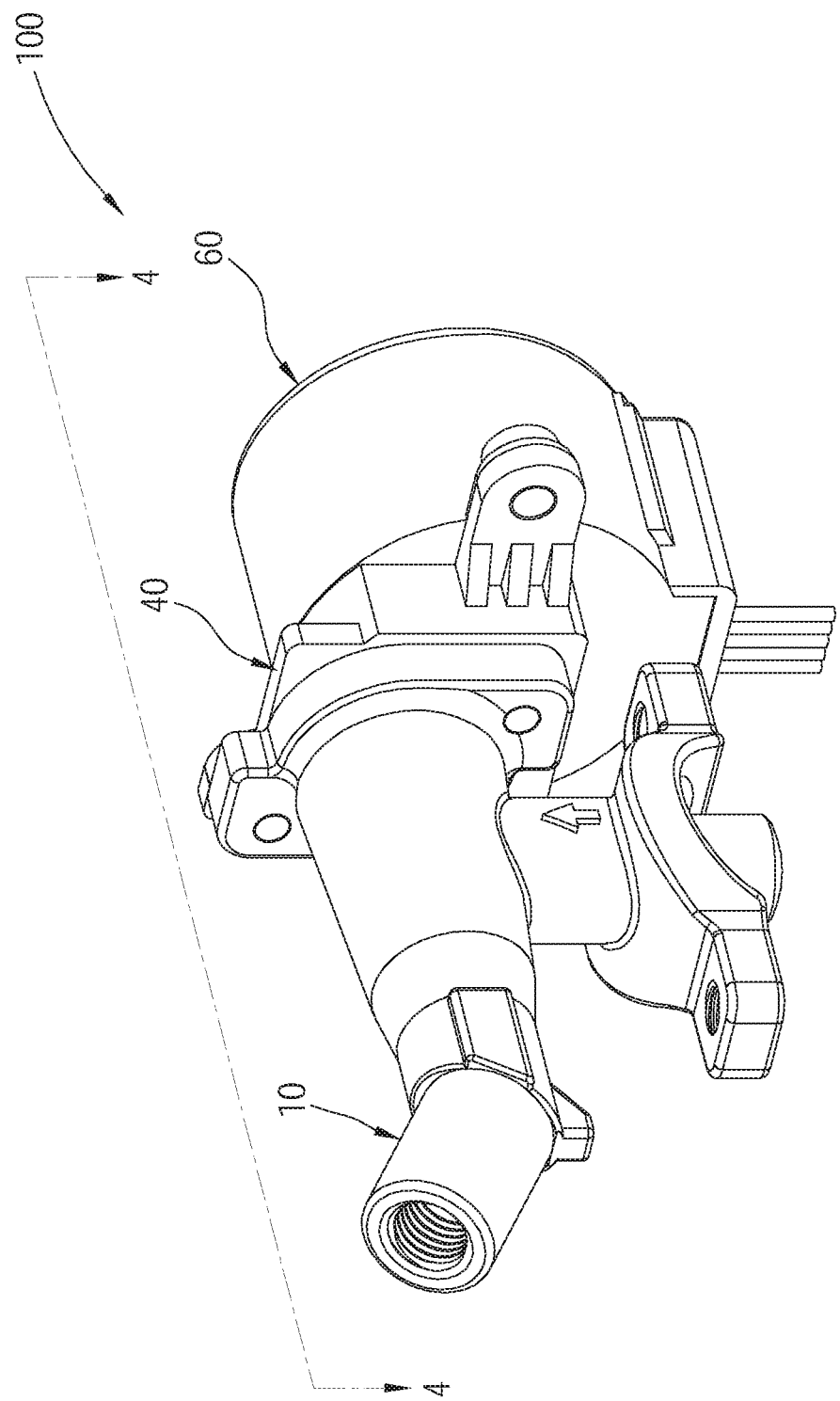
FIG. 1 is a perspective view of a flow regulating valve of a gas stove of a preferred embodiment of the present invention.
Figure 2:
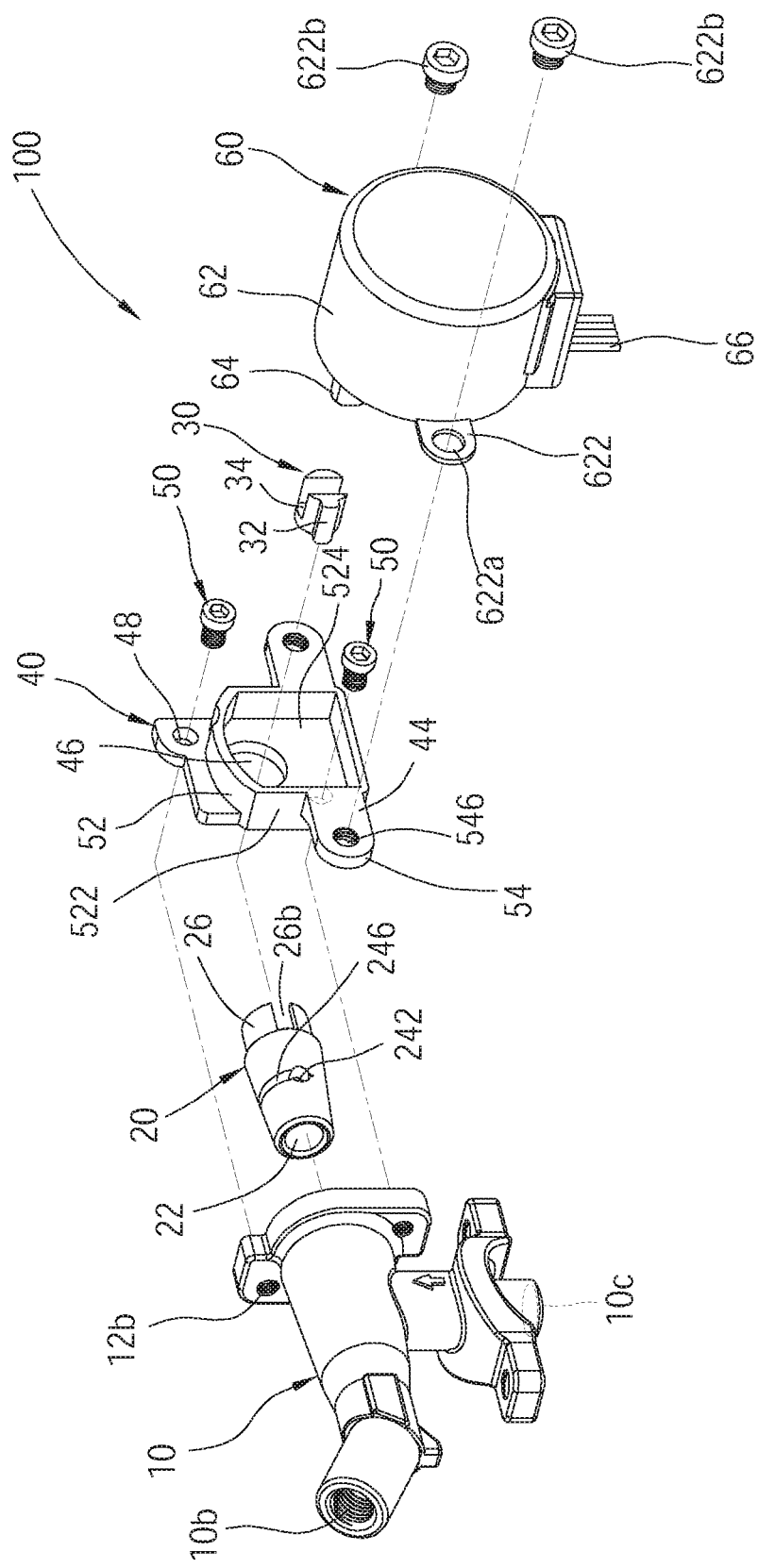
FIG. 2 is an exploded view of the flow regulating valve of the gas stove of the preferred embodiment.
Figure 3:
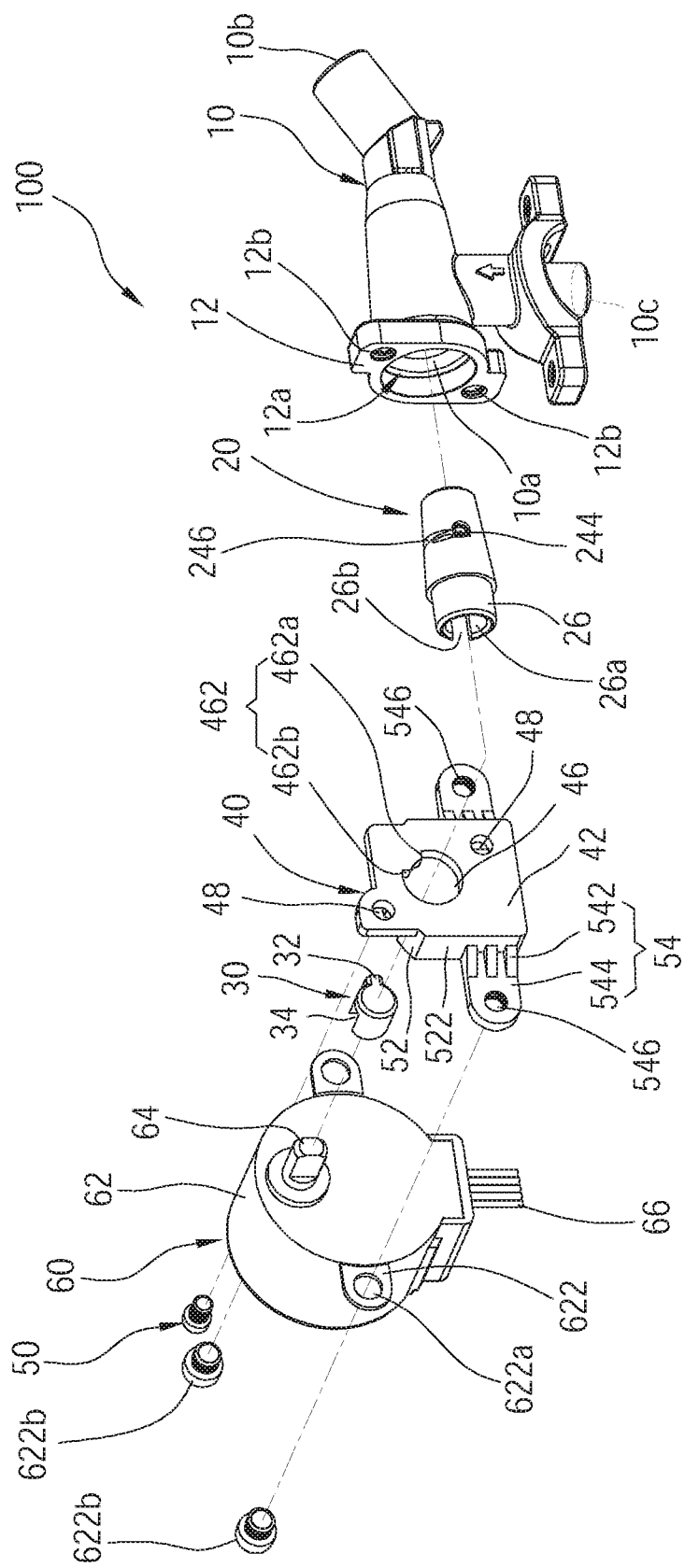
FIG. 3 is another exploded view of the flow regulating valve of the gas stove of the preferred embodiment (some bolts are not shown)

FIG. 1 to FIG. 3 show a flow regulating valve 100 of a gas stove of a preferred embodiment according to the present invention. The gas stove can be a barbecue grill or a kitchen gas stove. The flow regulating valve 100 includes a valve member 10, a plug member 20, a connecting member 30, a fixed base 40 and a stepper motor 60.

The valve member 10 has a chamber 10a, an outlet hole 10b, and an inlet hole 10c. The chamber 10a is located between the inlet hole 10c and the outlet hole 10b, and the inlet hole 10c communicates with the outlet hole 10b through the chamber 10a to form an air passage. The outlet hole 10b is located at a front end of the valve member 10, and a rear end of the valve member 10 is a joint end 12. The joint end 12 has an opening 12a and two threaded holes 12b, the opening 12a communicates with the chamber 10a, and the two threaded holes 12b are respectively located on an outer side in a radial direction of the opening 12a.

The plug member has a conical shape and is rotatably disposed in the chamber 10a of the valve member 10 for regulating the gas flow that flows through the air passage. As illustrated in FIG. 2 to FIG. 5, the plug member 20 has an axial bore 22 in an axial direction and a flow regulating structure 24 in a radial direction, the axial bore 22 corresponding to the outlet hole 10b and the flow regulating structure 24 corresponding to the inlet hole 10c. In the current embodiment, the flow regulating structure 24 has a first bore 242, a second bore 244, and a guiding slot 246. The first bore 242, the second bore 244, and the axial bore 22 communicate with each other, and a bore diameter of the first bore 242 is larger than that of the second bore 244. The guiding slot 246 is located between the first bore 242 and the second bore 244 and communicates with the first bore 242. The width of the guiding slot 246 decreases gradually from the first bore 242 to the second bore 244. The flow regulating structure 24 is only an example to realize the regulation of the flow, not intended to limit the present invention.

The plug member 20 has a connecting end 26 that faces away from the axial bore 22 and corresponds to the opening 12a of the joint end 12 of the valve member 10. The connecting end 26 has a recess hole 26a and a notch 26b. The recess hole 26a is located in an axial direction of the plug member 20 and does not communicate with the axial bore 22, and the notch 26b is located at a side of the recess hole 26a and communicates with the recess hole 26a.

Figure 4:
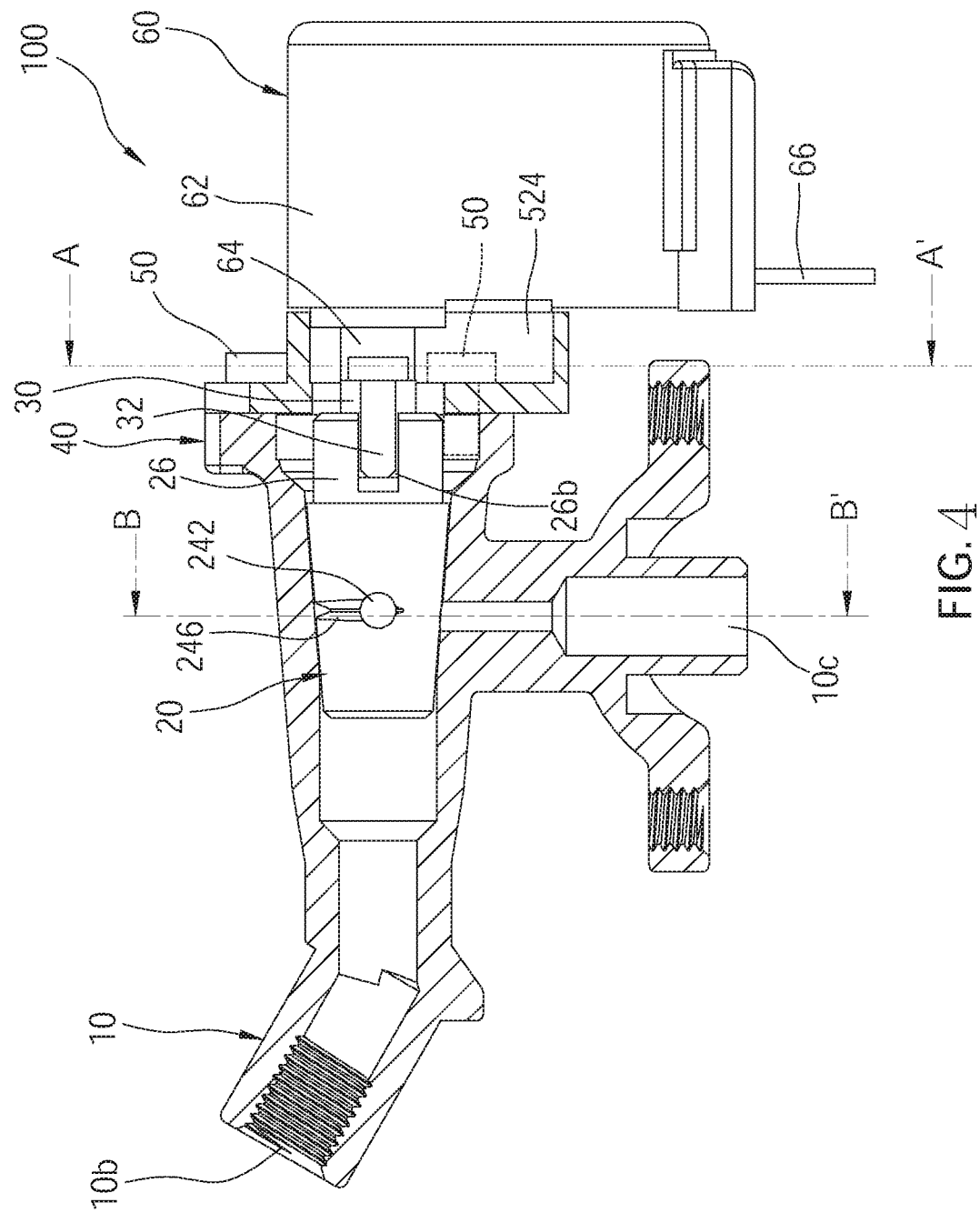
FIG. 4 is a partial cross-sectional view of the flow regulating valve of the preferred embodiment.
Figure 5:
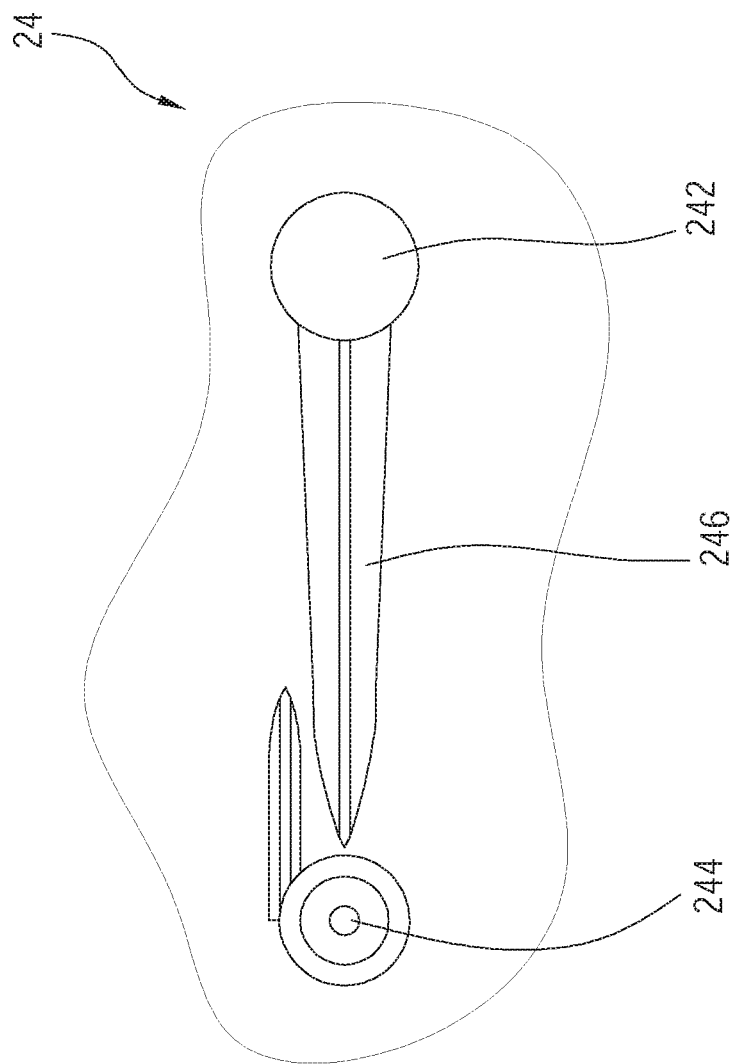
FIG. 5 is a partial expanded view of the outer peripheral surface of a plug member of the preferred embodiment.

As illustrated in FIG. 3 and FIG. 4, the connecting member 30 is detachably disposed in the recess hole 26a of the connecting end 26. The connecting end 26 has a cylindrical shape and has a block 32 projecting out in a radial direction thereof and a groove 34 recessed in an axial direction thereof. A part of the block 32 is inside the notch 26b, two side walls of the block 32 respectively abut against two side walls of the notch 26b, while another part of the block 32 extends out of the notch 26b in an axial direction of the connecting member 30; more specifically, the another part of the block 32 is located outside the opening 12a of the joint end 12. In practice, the connecting member 30 and the connecting end 26 of the plug member 20 are engaged fixedly or formed integrally.

Figure 6:
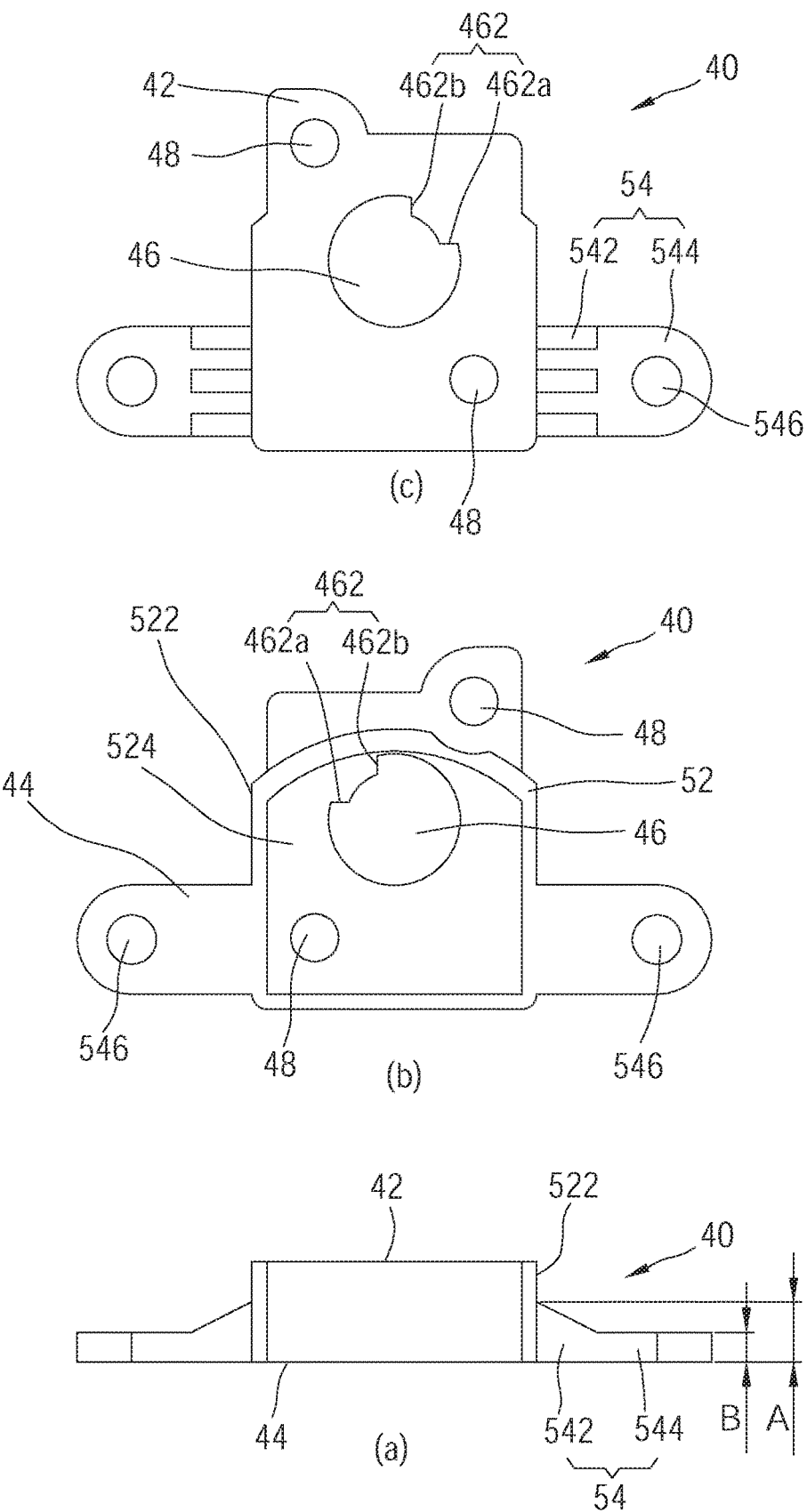
FIGS. 6(a)-(c) respectively show a front view, a back view, and a top view of a fixed base of the preferred embodiment.

The fixed base 40 is adapted to fix the stepper motor 60 at the rear end of the valve member 10. As illustrated in FIG. 2, FIG. 3, and FIG. 6, the fixed base 40 has a first side 42 and a second side 44. The first side 42 and the second side 44 positioned back-to-back, the first side 42 is engaged with the joint end 12 of the valve member 10, and the second side 44 is engaged with the stepper motor 60. The fixed base further has a through hole 46 communicating with the first side 42 and the second side 44 and corresponding to the opening 12a of the joint end 12. An abutting part 462 which projects out in a direction from an inner side of a wall of the through hole 46 to a center of the through hole 46 is formed. The abutting part 462 has a first block section 462a and a second block section 462b. The first block section 462a and the second block section 462b are both in the through hole 46 and do not project out of the through hole 46. A space for rotating the block 32 is formed between the first block section 462a and the second block section 462b. A part of the connecting member 30 is in the through hole 46, and the part of the block 32 outside the opening 12a projects into the space. In practice, the connecting end 26 of the plug member 20 can project out of the opening 12a of the joint end 12, such that the block 32 is entirely outside the opening 12a and projects into the space.

More specifically, the fixed base 40 includes a base body 52 and two first joint parts 54. A side of the base body 52 facing the valve member 10 forms the first side 42 of the fixed base 40. The base body has two side walls 522 positioned back-to-back, and the two first joint parts 54 are respectively connected to the two side walls 522. A side of the base body 52 facing the stepper motor 60 and the two first joint parts 54 form the second side 44 of the fixed base 40.

The base body 52 has the through hole 46 and two bores 48. The two bores 48 correspond to two threaded holes 12b of the joint end 12. Two bolts 50 respectively pass through the two bores and are screwed into the two threaded holes, so that the first side 42 is engaged with the joint end 12 of the valve member 10. In the current embodiment, the base body 52 has a receiving cavity 524. An opening of the receiving cavity 524 faces the stepper motor 60, and the through hole 46 and one bore 48 are located on an inner face of the receiving cavity 524. As illustrated in FIG. 4, a head of one bolt 50 is accommodated in the receiving cavity 524. In practice, if the receiving cavity 524 is larger, the two bores 48 are both located on the inner face of the receiving cavity 524 so that two heads of the two bolts 50 can be both accommodated in the receiving cavity 524.

As illustrated in FIG. 6, each of the first joint parts 54 has a connecting section 542 and an engaging section 544. Each of the connecting sections 542 is located between one engaging section 544 and the corresponding one side wall 522 of the base body 52, and each connecting section 542 has a plurality of reinforced ribs. In a direction of the second side 44 of the fixed base 40 to the first side 42 thereof, a thickness A of each connecting section 542 is greater than a thickness B of each engaging section 544. In the current embodiment, the thickness A of each connecting section 542 increases gradually from each engaging section 544 to the corresponding one side wall 522 of the base body 52, whereby a structural strength of the first joint part 54 increases. Each of the engaging sections 544 of the first joint parts 54 has a threaded hole 546 (shown in FIG. 3.)

The stepper motor 60 includes a motor body 62 and a rotating shaft 64. There are a stator and a rotor inside the motor body 62 (not shown in figures). A side of the motor body 62 faces the opening of the receiving cavity 524 of the base body 52, and two sides of the motor body 62 respectively have a second joint part 622. Each of the second joint parts 622 has a bore 622a, and two bolts 622b respectively pass through the two bores 622a and are screwed into each of the threaded holes 546 of the first joint parts 54, such that each first joint part 54 is engaged with the corresponding one second joint part 622. Thereby, the motor body 62 is engaged with the second side 44 of the fixed base 40. The rotating shaft 64 passes through the groove 34 of the connecting member 30. In the current embodiment, the stepper motor 60 is electrically connected to a control device (not shown in figures) via a control wire 66 for receiving a pulse signal generated by the control device to control a rotating angle of the rotating shaft 64.

In practice, the motor body 62 can be integrally connected to the fixed base 40, that is, the motor body 62 and the fixed base 64 are formed integrally. In this case, the two bores 48 of the fixed base 64 are located on two sides of the fixed base 64 so as to be screwed into the threaded holes 12*b* of the valve member 10 by bolts passing through each bore 48 from the outside.

Figure 7:
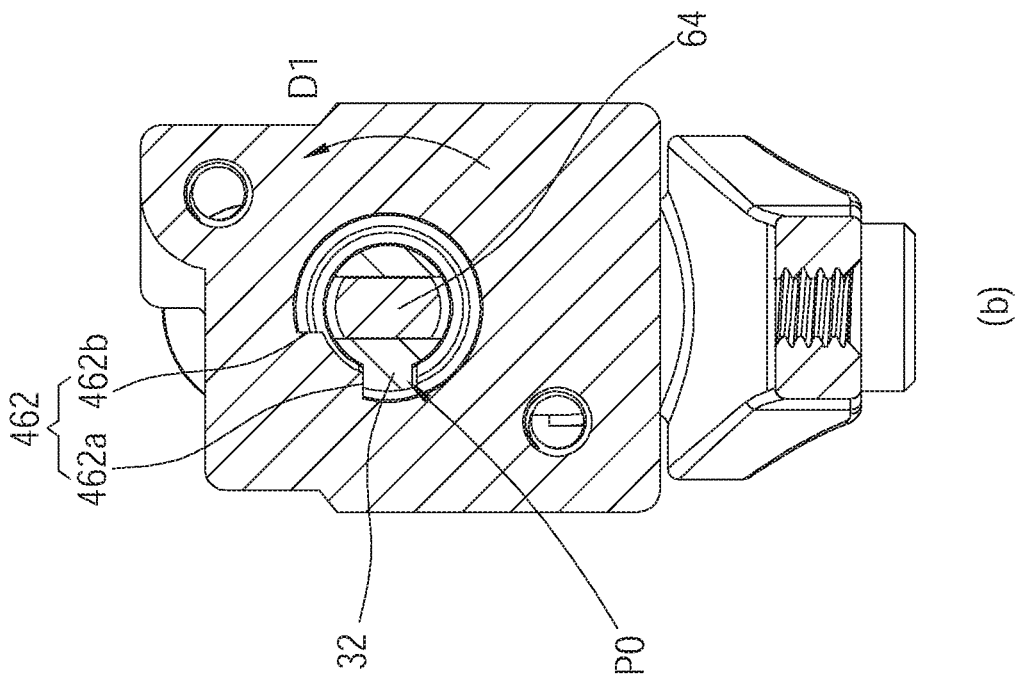
FIG. 7 is a schematic view showing that a relative position of the plug member and an inlet hole when a block abuts against the first block section, wherein (a) is a cross-sectional view of FIG. 4 along lines A-A' and (b) is a cross-sectional view of FIG. 4 along lines B-B'.
Figure 7:
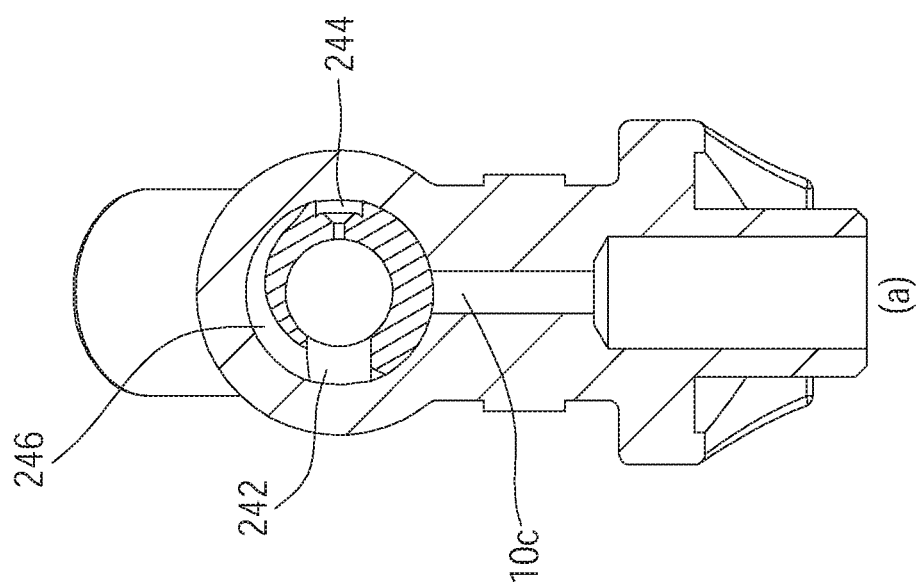

As illustrated in FIG. 4 and FIG. 7, when the block 32 abuts against the first block section 462*a* of the abutting part 462, the block 32 is defined to be located at an origin position P0, and an outer peripheral surface of the plug member 20 closes the inlet hole 10*c* to block the gas flow.

Figure 8:
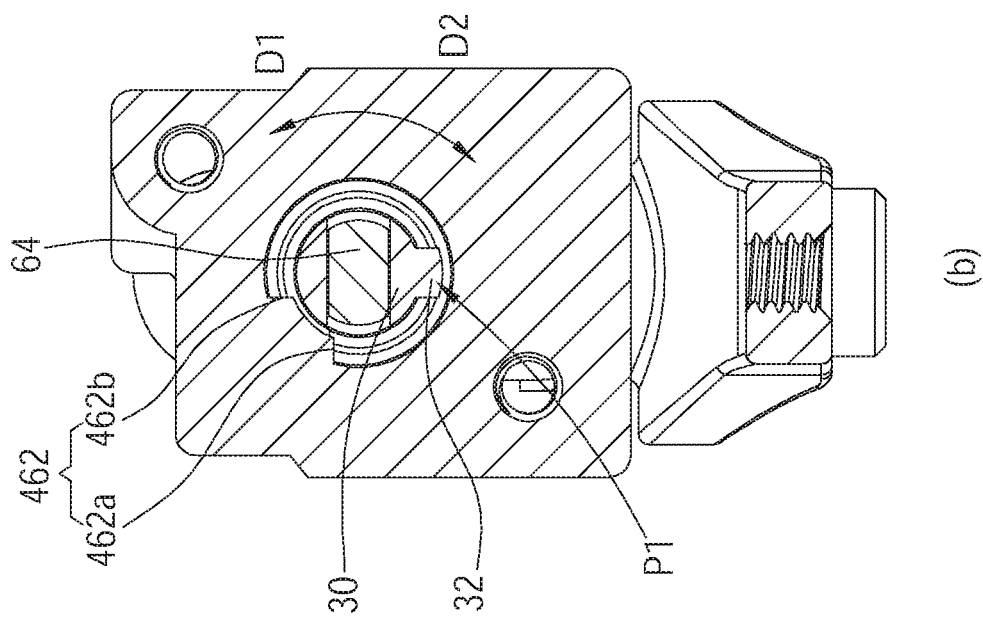
FIG. 8 is a schematic view showing that a relative position of the plug member and the inlet hole when the block is at the first position.
Figure 8:
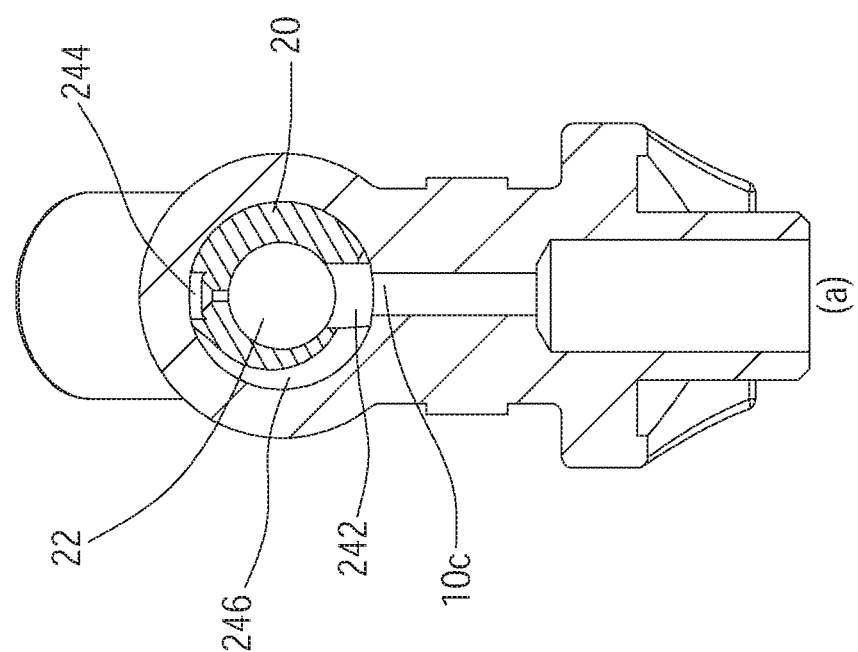

As illustrated in FIG. 8, when the control device transmits a pulse signal of a first predetermined steps along a first rotating direction D1 to the stepper motor 60, the rotating shaft 64 drives the connecting member 30 to rotate along the first rotating direction D1, so that the block 32 moves from the origin position P0 to a first position P1. At the time, the first bore 242 of the plug member 20 corresponds to the inlet hole 10*c* so that gas flows through the first bore 242 and then through the axial bore 22 and the outlet hole 10*b* to the outside.

Figure 9:
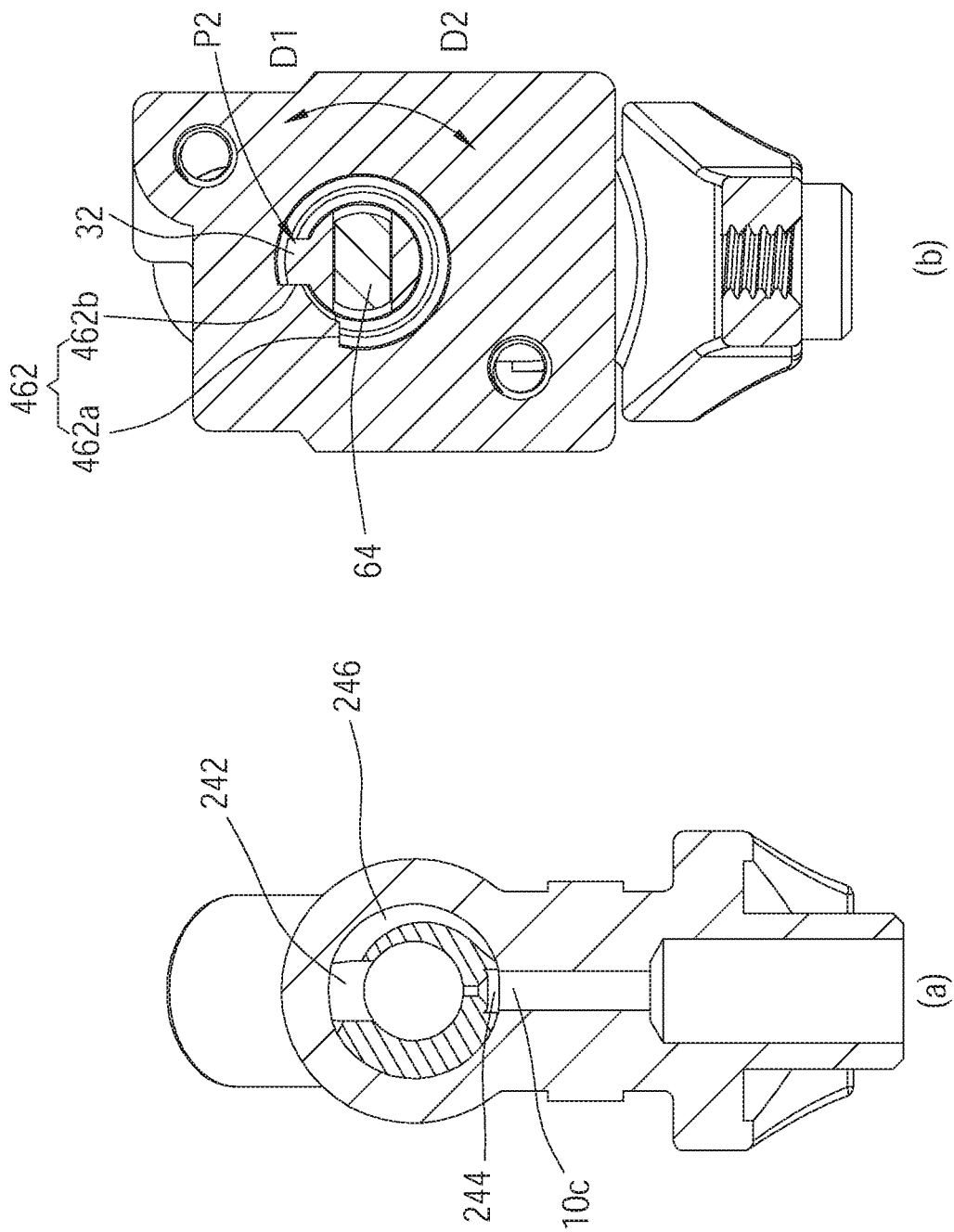
FIG. 9 is a schematic view showing a relative position of the plug member and the inlet hole when the block abuts against the second block section.

As illustrated in FIG. 8 and FIG. 9, when the control device transmits a pulse signal of a second predetermined steps along the first rotating direction D1 to the stepper motor 60, the rotating shaft 64 drives the connecting member 30 to rotate along the first rotating direction D1. During the rotation, the guiding slot 246 having the gradually decreased width moves relative to the inlet hole 10*c*, such that gas flow is reduced linearly, and finally the block 32 abuts against the second block section 462*b* and is located at a second position P2. At the time, the second bore 244 of the plug member 20 corresponds to the inlet hole 10*c* so that gas flows through the second bore 244 and then through the axial bore 22 and the outlet hole 10*b* to the outside. Since the bore diameter of the second bore 244 is smaller than that of the first bore 242, the gas flow that passes through the second bore 244 is the smallest.

When the block 32 is to be back to the origin position P0, the control device transmits a pulse signal of a third predetermined steps along a second rotating direction D2. The second rotating direction D2 is opposite to the first rotating direction D1, and a number of the third predetermined steps is greater than or equal to the sum of the first predetermined steps and the second predetermined steps, such that the rotating shaft 64 drives the connecting member 30 to rotate along the second direction and the block 32 is back to the origin position P0. Preferably, the number of the third predetermined steps is greater than the sum of the first predetermined steps and the second predetermined steps, so that the block 32 can abut against the first block section 462*a* to ensure that the block 32 moves back to the origin position P0 to block the gas flow. In other words, as long as the sum of the steps in the second rotating direction D2 is greater than that in the first rotating direction D1, it is ensured that the block 32 is back to the origin position P0.

The flow regulating valve of the gas stove of the present invention controls gas flow through the stepper motor to achieve the automatic control of the gas stove. On the other hand, the valve member and the motor body are connected to each other through the fixed base to achieve the modular flow regulating valve, which is advantageous for assembly in the gas stove.

It must be pointed out that the embodiments described above are only some embodiments of the present invention. All equivalent structures which employ the concepts disclosed in this specification and the appended claims should fall within the scope of the present invention.

What is claimed is:

1. A flow regulating valve of a gas stove, comprising:
   a valve member having an inlet hole, an outlet hole and a chamber which respectively communicates with the inlet hole and the outlet hole; the valve member having a joint end which is provided with an opening communicating with the chamber;
   a plug member having an axial bore in an axial direction thereof and a flow regulating structure in a radial direction thereof, the flow regulating structure communicating with the axial bore; the plug member rotatably provided in the chamber of the valve member, the axial bore corresponding to the outlet hole and the flow regulating structure corresponding to the inlet hole; the plug member having a connecting end facing away from the axial bore and corresponding to the opening of the joint end;
   a connecting member disposed on the connecting end, the connecting member having a block in a radial direction thereof, and at least a part of the block located outside the opening of the joint end;
   a fixed base having a first side and a second side positioned back-to-back, wherein the first side is engaged with the joint end of the valve member; the fixed base further having a through hole communicating with the first side and the second side and corresponding to the opening, wherein a wall of the through hole is provided with a first block section and a second block section, a space for rotating the block is formed between the first block section and the second block section, the connecting member passes through the through hole, and at least a part of the block is in the space to limit a rotating angle of the plug member; and
   a stepper motor including a motor body and a rotating shaft, wherein the stepper motor body is connected to the second side of the fixed base and the rotating shaft is connected to the connecting member.

2. The flow regulating valve of the gas stove of claim 1, wherein the fixed base includes a base body and two first joint parts, the base body has the through hole and two side walls positioned back-to-back, and the two first joint parts are respectively connected to the two side walls; two sides of the motor body respectively have a second joint part, and each of the first joint parts corresponds to each of the second joint parts and is connected to each other.

3. The flow regulating valve of the gas stove of claim 2, wherein each of the first joint parts has a connecting section and an engaging section, each of the connecting sections is located between one engaging section and the corresponding one side wall of the base body, and a thickness of each connecting section is greater than that of each engaging section.

4. The flow regulating valve of the gas stove of claim 3, wherein each of the first joint parts has a threaded hole, each of the second joint parts has a bore, and two bolts respectively pass through the two bores and are screwed into the two threaded holes, so that each of the first joint parts and each of the second joint parts are engaged with each other.

5. The flow regulating valve of the gas stove of claim 3, wherein the thickness of each connecting section gradually increases from each engaging section to the corresponding one side wall of the base body.

6. The flow regulating valve of the gas stove of claim 1, wherein the joint end of the valve member has two threaded holes, the fixed base has two bores respectively corresponding to the two threaded holes, and two bolts respectively pass through the two bores and are screwed into the two threaded holes.

7. The flow regulating valve of the gas stove of claim 6, wherein the fixed base includes a base body having a receiving cavity, an opening of the receiving cavity faces the motor body, and the through hole and at least one of the two bores are located on an inner face of the receiving cavity.

8. The flow regulating valve of the gas stove of claim 2, wherein the connecting end of the plug member has a recess hole and a notch which communicate with each other; the connecting member passes through the recess hole, and a part of the block extends into the notch.

9. The flow regulating valve of the gas stove of claim 1, wherein the motor body is integrally connected to the second side of the fixed base.

\* \* \* \* \*